(12) United States Patent
Bharti et al.

(10) Patent No.: US 10,832,419 B2
(45) Date of Patent: Nov. 10, 2020

(54) COGNITIVE SEARCH ANALYTICS FOR MULTI-DIMENSIONAL OBJECTS

(71) Applicant: International Business Machines Corporation, Armonk, NY (US)

(72) Inventors: Harish Bharti, Pune (IN); Abhay Patra, Pune (IN); Sarbajit K. Rakshit, Kolkata (IN); Rajesh Kumar Saxena, Maharashtra (IN); Sandeep Sukhija, UP (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 134 days.

(21) Appl. No.: 16/204,311

(22) Filed: Nov. 29, 2018

(65) Prior Publication Data

US 2020/0175696 A1 Jun. 4, 2020

(51) Int. Cl.
| | |
|---|---|
| *G06K 9/62* | (2006.01) |
| *G06T 7/292* | (2017.01) |
| *G06F 16/55* | (2019.01) |
| *G06N 7/00* | (2006.01) |
| *G06N 5/02* | (2006.01) |
| *G06N 20/00* | (2019.01) |
| *G06K 9/00* | (2006.01) |

(52) U.S. Cl.
CPC ............ *G06T 7/292* (2017.01); *G06F 16/55* (2019.01); *G06K 9/00624* (2013.01); *G06K 9/6228* (2013.01); *G06K 9/6262* (2013.01); *G06K 9/6282* (2013.01); *G06N 5/022* (2013.01); *G06N 7/005* (2013.01); *G06N 20/00* (2019.01); *G06T 2207/20076* (2013.01); *G06T 2207/20081* (2013.01)

(58) Field of Classification Search
CPC .. G06K 9/6217; G06K 9/6228; G06K 9/6262; G06K 9/6267; G06K 9/6282; G06T 2207/20081; G06F 16/50; G06F 16/55
See application file for complete search history.

(56) References Cited

U.S. PATENT DOCUMENTS

| | | | | |
|---|---|---|---|---|
| 5,890,143 | A | * | 3/1999 | Sakurai ............... G06N 7/02 706/12 |
| 7,197,504 | B1 | * | 3/2007 | Runkler et al. ...... G06K 9/6223 |
| 2006/0085177 | A1 | | 4/2006 | Toyama et al. ............... 703/22 |
| 2016/0373570 | A1 | | 12/2016 | Scavezze et al. ............................ H04M 1/72527 |
| 2017/0053171 | A1 | | 2/2017 | Buehler ............ G06K 9/00771 |

(Continued)

OTHER PUBLICATIONS

Mel, et al. "The NIST Definition of Cloud Computing". Recommendations of the National Institute of Standards and Technology. Nov. 16, 2015.

*Primary Examiner* — Andrew W Johns
(74) *Attorney, Agent, or Firm* — Jay Wahlquist, Esq.; McGinn IP Law Group, PLLC

(57) ABSTRACT

A method (and structure and computer product) of recognizing and tracking an object includes receiving image data from at least two camera sensors and analyzing the image data to determine attributes of an object detected as present in the image data. A first decision tree (DT) is developed to classify the object, based on the attributes determined from the image data. A second DT is developed to refine the first DT, wherein the second DT is used to refine the first DT by determining which attributes are most significant in the classification of the object.

16 Claims, 6 Drawing Sheets

(56) References Cited

U.S. PATENT DOCUMENTS

2019/0370600 A1* 12/2019 Deng et al. .......... G06K 9/6282
2020/0195552 A1*  6/2020 Xu et al. ................ H04L 45/48

* cited by examiner

COGNITIVE SEARCH ANALYTICS FOR MULTI-DIMENSIONAL OBJECTS

BACKGROUND

The present invention relates generally to a model for cognitive search analytics for objects. More specifically, two decision trees, interrelated by a feature-functional-fitment mechanism, are used in a method of analyzing streams of visuals to determine a current state of an object, including providing an alert if the object is determined as in a lost state.

It is common to store a lot of gadgets, documents, devices and other objects in the office or home at different locations, for example, drawers, cupboards, lockers, wardrobes and cabinets. There is a general tendency to use a lot of such type of storage places and sometimes it is common to forget about the exact place where items have been placed. It is also common in such scenarios to spend a lot of time searching for such objects at different places at home or in the office looking for items that we thought we had stored somewhere.

SUMMARY

According to an exemplary embodiment, the present invention provides cognitive search analytics for multi-dimensional objects to provide a method which can useful to find objects whenever required, based upon their different state at different times. Here, the term "multidimensional" refers to not only special dimensions, for example, 3-dimensional (3D), but also other possible dimensions such as, for example, color, scratches, marks, text, codes, etc. Objects can be tracked over an associated object life-cycle such as a state that determines an object's state is, for example, hidden/visible, etc.

Irrespective of the state classification of the object the system maintains and keeps a track of all previously known locations of the object to determine where the object was last placed or moved. Therefore, even if an object is not classified as being in a lost state, embodiments of the present invention provides a mechanism to maintain a record of an object's previously-known locations, to permit the object to be easily located if the owner forgets where the object was last placed or moved.

More specifically, in one exemplary aspect of the present invention, a method is described herein for recognizing and tracking an object includes receiving image data from at least two camera sensors and analyzing the image data to determine attributes of an object detected as present in the image data. A first decision tree (DT) is developed to classify the object, based on the attributes determined from the image data. A second DT is developed to refine the first DT, wherein the second DT is used to refine the first DT by determining which attributes are most significant in the classification of the object.

In a second exemplary aspect, also described herein is a method of recognizing and tracking an object, including receiving image data from at least two camera sensors and analyzing the image data to determine attributes of an object detected as present in the image data. Two decision trees (DTs) are concurrently developed, such that a first DT determines a classification of the object and a second DT is developed to prevent the first DT from becoming congested.

In a third exemplary aspect, also described herein is a method of detecting whether an object detected in a field of view of camera sensors is lost, including receiving image data from at least two camera sensors; analyzing the image data to detect the object in the field of view and to determine attributes of the object for classifying the object; and calculating a threshold value for determining a current status of the object being present or lost.

DETAILED DESCRIPTION

Figure 1:
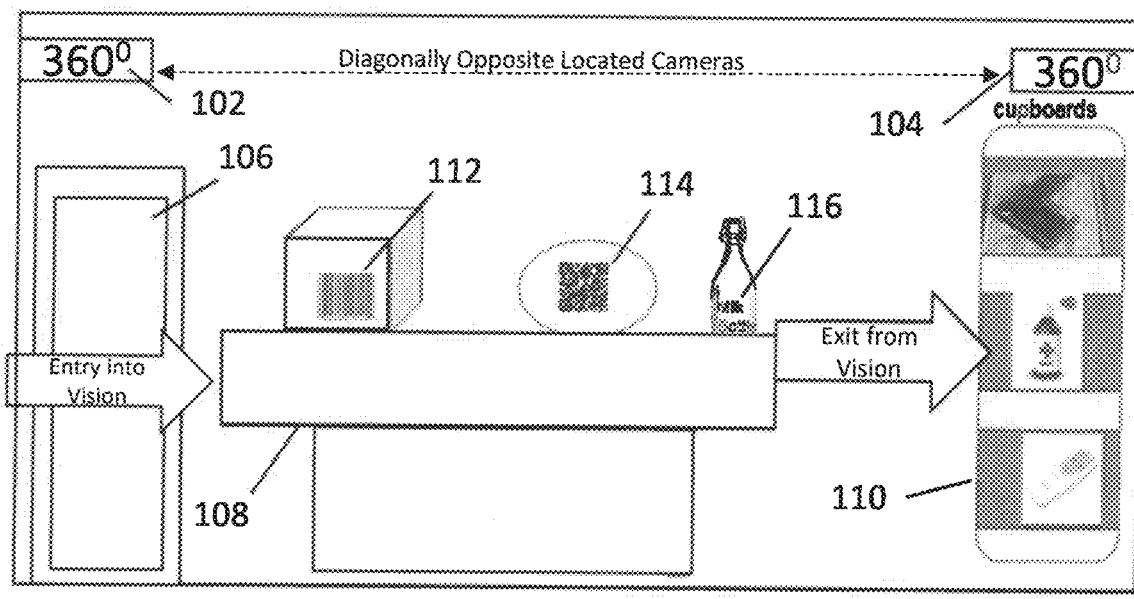
FIG. 1 exemplarily shows a scenario in which cameras provide data for tracking objects.

With reference now to FIG. 1, an example framework according to embodiments of the present invention provides a model for cognitive search analytics for objects, including cameras 102, 104 providing video inputs for detecting objects 112, 114, 116 located within the area covered by the video images.

Figure 2:
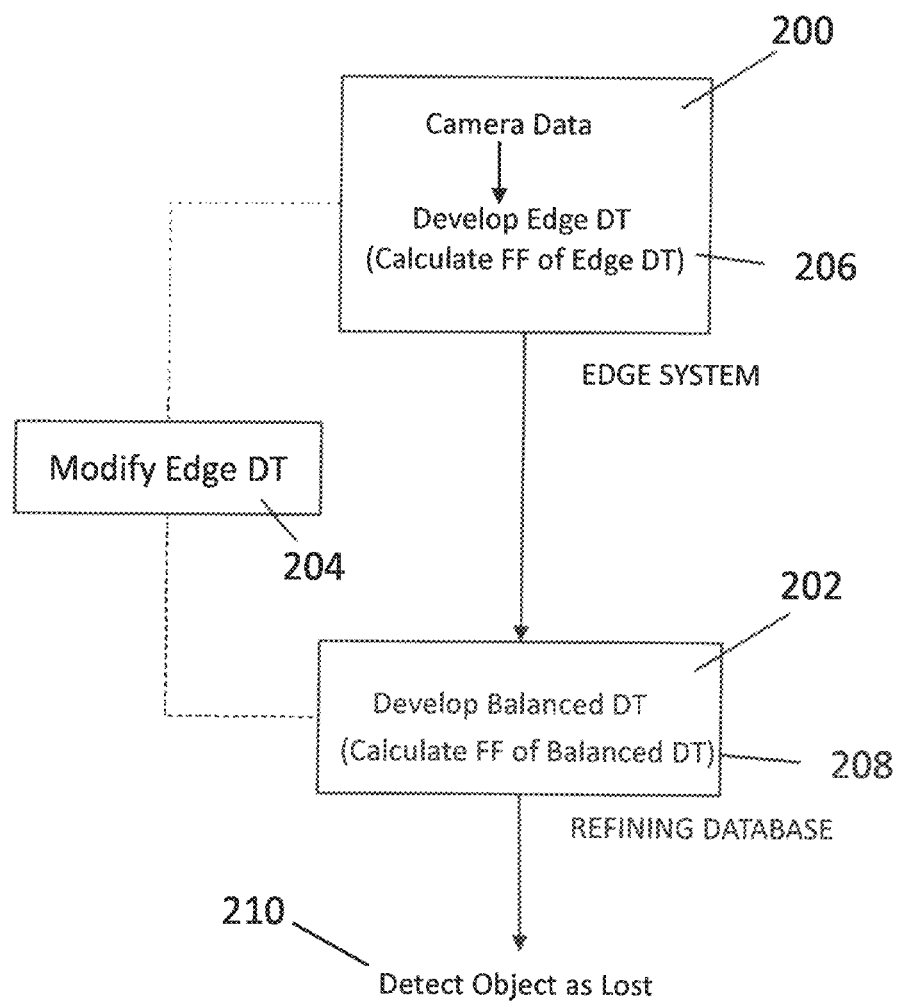
FIG. 2 shows one example of providing two co-evolving populations of DTs to optimize object recognition according to embodiments of the present invention.

As shown in FIG. 2, an example system according to embodiments of the present invention is based upon two parts. The first part 200 is the edge system (camera and its support system) that tracks the streams of visuals to give a probability estimate of what is the current state of a tracked object. The edge system develops/maintains an edge decision tree (DT) based on attributes detected from analysis of the video inputs, in order to classify an object within the viewpoint of the cameras.

The second part 202 of the system is a refining database which learns these values from the edge system DT and develops/maintains a balanced DT using a different criterion. The purpose of this balanced DT mechanism is to permit the system to continuously detect whether the best attributes are being used in the DTs for classifying the object.

An optimization routine 204 between these two systems 200, 202 is incorporated so that the decision tree (DT) being developed/maintained in the edge system does not become large and full of heuristic values. To avoid this congestion state, embodiments of the present invention includes a mechanism for feature functional fitment 206, 208 on the two trees.

Finally, an alerting mechanism 210, which comes from the refining dataset that is learning the values, so that, when a threshold is reached, creates an alert, which is then passed to the system layer.

Thus, as shown in the exemplary scenario in FIG. 1, an exemplary embodiment of the invention includes one or more high-resolution video cameras 102, 104 providing video streams of objects in their field of view. In the exemplary scenario, two video cameras 102, 104 are mounted diagonally across a room, thereby providing a viewing field of the entire room. When an object enters into the room via entry door 106, the system will identify and track its location(s) until the object exits, typically via the door 106. During the period an object is in the room, it may remain, for example, on top of a table or cabinet 108, but may exit from view of the cameras when it is stored in, for example, a cupboard 110.

An object may have a distinctive marking, such as a linear barcode 112, a matrix barcode 114, or a label 116, that can provide a unique and positive identification of the object when in view in the video stream. Distinctive markings typically come into play particularly in case of identical objects, for example, two tennis racquets or two milk bottles. Practically speaking, only if these two similar objects are new, for example, having just been purchased, they may not have markings, such as scratches or other wear markings that can distinguish basically identical objects from each other upon closer inspection. However, in a few days and based on usage, they will soon develop distinctive markings from the way their user uses them, such that two very similar objects can still be distinguished without relying on more formal distinctive marking such as linear or matrix barcodes.

Embodiments of the present invention include one or more novel features, including, but not necessarily limited to:

1. A method and framework for cognitive search analytics for multi-dimensional objects that performs cognitive visual state analysis using edge system/devices (camera and support systems) and refines the object database to end states of the object.
2. The method maintains and tracks the various object states, such as, for example, visible, hidden, or open, using cognitive visual state analysis and object database.
3. The method employs multiple decision tree models for subpopulation classification object state data and alerts when preconfigured threshold object state values are observed, e.g., if the multi-dimensional object is not visible for two days continuously.
4. The method optimizes the individual decision trees to build accurate decision trees where all single-class accuracies are balanced. For example, an edge decision tree will optimize solutions regarding the overall predictive performance, while the refining database will optimize solutions regarding the balanced single-class accuracies.
5. The method determines a single solution by defining a function to exchange/map attributes from different classes of the decision tree and employ empirical and supervised learning between object life-cycles to accurately define the single and global decision class determining the object state.

In the context of the present disclosure, the term "balanced" means that the classification should not easily settle into deciding an object and rule out the possibility of the object is another similar object. The term "optimized" refers to a fast way to confirm the type of object.

As the object passes through its life-cycle states, the framework would first identify, with a high level of accuracy of its estimation, an object, and, second, decide what state the object is in, which can range from, for example, hidden, unknown, open, etc. The decision will be built on a continuous data stream which is available after the system is able to recognize the object. All values would then have to be discerned into different classification states.

Traditionally, decision trees (DTs) are one of the most widely used data classification methods. The decision tree method is reliable and provides classification performance comparable with other classification approaches. Most DT induction algorithms employ the top-down greedy strategy for building the tree. Nonetheless, the top-down approach is prone to falling into local-optima since it locally optimizes a criterion for each node of the tree in a recursive fashion.

In view of this tendency to fall into local-optima, embodiments of the present invention address the problem of classification differently. In one sense, classification can be regarded as an optimization problem, where the goal is to find a function $f$ that better approximates the unknown true function $f$ responsible for mapping attribute values from an input space into discrete categories (decision classes), that is $f:X \rightarrow Y$, where X is data from an input space and Y is a group of discrete categories.

Therefore, in embodiments of the present invention, the resultant value of data streams is broken down into two subpopulation classifications:

An edge-based classification which provides all values for all attributes of the multi-dimensional object; and A refining-dataset, which is a classification which learns on the residual values and alerts when a threshold is reached, for instance, if the multi-dimensional object is not visible for two days continuously, the system would generate an alert.

Thus, some implementations of the present invention include two co-evolving populations of DTs, where each population is being evolved regarding a different criterion, and the information exchange between the two populations provides the means to generate one single balanced solution. Simply put, the present inventors have recognized that the occurrence of premature convergence needs to be avoided. A very definite dataset and decision model are used in embodiments of the present invention to arrive at an optimized DT and thus the resulting state of the object being tracked.

In view of addressing the premature convergence problem, implementations of the present invention define function fit equations for both of the subpopulation classifications and then builds a learning function fit equation for the refining dataset. Finally, embodiments of the present invention provide an alerting system that triggers when the threshold is reached.

Defining the Generation Tree—a DT Variant

In example DTs of the present invention, node type can be either class or test node. Depending on the node type, the index represents either a decision class number or a test attribute index. For example, in FIG. 1, a bottle might be a class, meaning that it has an associated class number. Below the bottle class might be a test attribute node for 'text characters' the might match to 'water' or 'milk'. So, in this example, the test attribute is 'characters' for the bottle class.

Figure 3:
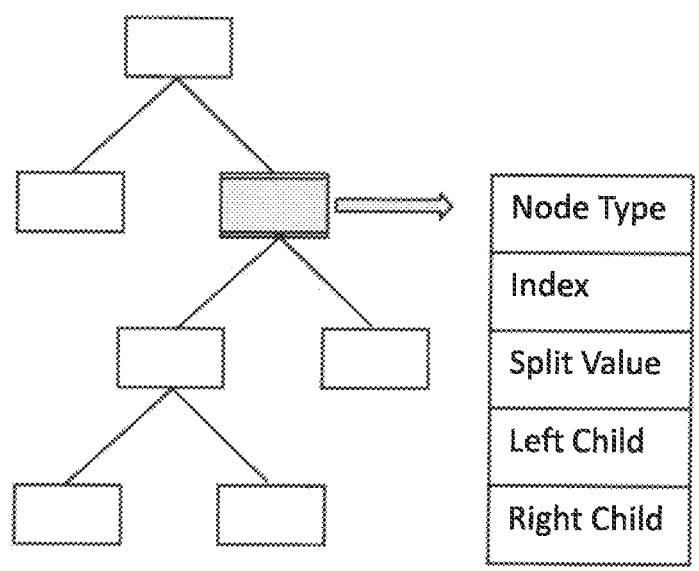
FIG. 3 exemplarily shows one example of how a split value of a decision tree (DT) is used as an index into the set of discrete value for a corresponding attribute.

In the case of continuous test nodes, a split value represents a splitting threshold th, so that instances with values lower than th proceed to the left child and the rest proceed to the right child, as demonstrated in FIG. 3. In the above example with text characters, the 'characters' node is a split mode since the text 'water' would route, for example, to the left node and absence of 'water' text would route to the right node.

In the case of discrete test nodes nodes, only the integer part of the split value int(th) is used as an index into the set of discrete values of the corresponding attribute, so that instances with values equal to int(th) proceed to the left child whereas instances with values differ from int(th) proceed to the right child, until a class (leaf) node is reached. For example, the bottle scenario can be extended a bit further by assuming that there is one registered water bottle and three registered milk bottles: one for whole milk, a second bottle for reduced fat milk, and a third bottled for fat free milk.

This scenario will consist of discrete test nodes such that a first test node was character, then a second test node would be, for example, color of a dot visible on the milk bottle such that, if the presence of a 'red dot' is detected, then it reaches leaf node 'whole milk', presence of blue dot reaches to the reduced fat leaf node, and, finally, no color fill dot reaches to the fat free milk node.

Moreover, as the object takes different states, the population can be broken into subpopulations. For example, subpopulations for a 'Bottle' object might be 'Water Bottle' and 'Milk Bottle'.

From the above description, it should be clear how a system can analyze image data to provide attribute data for a decision tree for recognizing and identifying objects in the field of view of the video sensors 102, 104.

Optimizing DT Using a Subpopulation

In an example DT mechanism of the present invention, accurate DTs are built where all single-class accuracies are balanced. In the scenario of FIG. 1, a balanced single class accuracy would mean that the DH is exactly able to identify whether a bottle is a water bottle or a whole milk bottle or a reduced fat milk bottle or a fat free milk bottle. If the DH is not yet able to zero down to a last class, then it is not yet a balanced tree.

Thus, in embodiments of the present invention, the edge DT will optimize solutions regarding the overall predictive performance, while the refining database will optimize solutions regarding the balanced single-class accuracies. In the above scenario, having a test node as a Water Bottle test node first is an optimized DT since there is only one water bottle and the DT can stop there. In contrast, for a Milk Bottle test node, an additional test node(s) is required before the DT determines whether the milk bottle is for whole milk, reduced fat milk, or fat free milk.

If it is now assumed in this milk bottle scenario that a milk bottle also has a letter written on the cap as 'W' for whole, 'R' for reduced fat and 'F' for fat free. But over a period of time, the model has learned that this attribute is not important for a milk bottle almost all of the time since the letter is covered with soil and is not readable. But, the presence of a specific dot still provides a good confirmation for identifying the type of milk bottle.

Thus, as the evolution of the classification model tends to produce unreachable nodes because of contradictory conditions such as this, a penalty is defined that will be cascaded across the tree. In this scenario, a node is reached for 'no dot found', which is possible even when the dot was covered with soil.

In this example, when such a node is reached sufficiently frequently, there is likely a need to introduce an additional attribute for reading cap letters, which is the purpose of the fitness functions in some embodiments of the present invention, which are defined as follows.

The fitness function $f\!f_{edge}$ for the edge DT is defined as:

$$f\!f_{edge} = (1 - fs) + \frac{1}{S} \cdot \frac{n}{sf}$$

(Edge DT Fitness Function)

where S is total number of instances, n is the number of nodes in the tree, $sf$ is a size factor that defines how many additional nodes outweigh one misclassified instance, and $fs$ is the F-Measure criterion, which indicates the balance between the precision and sensitivity, and is calculated as being the harmonic mean of the precision and recall values.

The values for $fs$ and $sf$ are fine-tuned by the model as it evolves. In an exemplary embodiment, the starting value for $f_s$ can be any value between 0 and 1, and the starting value for $sf$ is typically initially set at 10, and the model then continues to change these values to get higher accuracy. That is, as is well known in the art, in machine learning DT models, value of $sf$ and $f_s$ are fine-tuned/changed/optimized to get the desired accuracy of the output. Over time the DTs are tested with new test data and these parameters are fine-tuned changed/optimized for better accuracy.

The fitness function $f\!f_{rd}$ for the refining database DT is defined as:

$$f\!f_{rd} = \left(1 - \sum_{i=1}^{K} w_i \cdot acc_i\right) + \frac{1}{S} \cdot \frac{n}{sf}$$

(Refining Database DT Fitness Function)

where, K is the number of decision classes, $acc_i$ is the accuracy of the $i^{th}$ class, $w_i$ is the weight associated to the $i^{th}$ class, S is the total number of instances, n is the number of nodes in the tree, and $sf$ is a size factor that defines how many additional nodes outweigh one misclassified instance.

In an exemplary embodiment, the parameter $w_i$ is a user input value based on how important it is to identify whether a bottle is a water bottle or a milk bottle. The maximum value for $w_i$ indicates that the distinction is very important, so $w_i$ for the water bottle/milk bottle distinction might have the maximum value if distinction between water bottle/milk bottle is considered important. If it is less important to differentiate between reduced fat milk and fat free milk, a low value for $w_i$ will be used for this node.

The parameter $acc_i$ is a confidence level indicating whether high accuracy is achieved (or not) and $sf$ is auto calculated factor which is dynamically fine tuned Exchanging Key Data Points Between Edges and Refining Database If a balanced solution is sought, in which each class is equally important, the class accuracy weights can be set to $w_i=1/K$, leading to the following:

$$f\!f_{rd}\left(1 - \frac{1}{k}\sum_{i=1}^{K} acc_i\right) + \frac{1}{S} \cdot \frac{n}{sf}$$

Thus, the balanced DTs from the refining database will regularly feed the edge (and vice-versa) with building blocks needed to optimize the global decision. For example, if in above scenario, decision tree frequency goes into the 'no dot' scenario because the dot on the bottle for some reason currently always gets spoiled, then the tree needs to be optimized upfront to take note of both cap character and dot. The model would also now possibly need additional attribute(s), for example, scratches on glass bottles, which attribute(s) were not considered important earlier in the evolution of the model. These additional attributes may have dropped out during the evolution of a single subpopulation (edge or refining database) towards one direction within the search space.

This cross feeding would employ empirical and supervised learning between object life-cycles to accurately define the decision class. For example, empirical learning would be triggered in the system when the recognition processing goes into a situation where it is not able to identify a single class. A supervised learning technique can be used for permitting a user to explicitly instruct the model that a bottle is reduced fat bottle but rather than fat free.

Alert Mechanism on Deriving Resultant Probability

We now need to define an alerting mechanism that will decide the resultant probability of the multi-dimensional object, as, for example, determining whether the object's current state is "lost". This alert mechanism can be implemented as follows.

Let $R_i^j$ be the rank of the $j^{th}$ state of the probability distribution on $i^{th}$ refining dataset. The decision tree resultant iterative probability tracing is given by $$\varepsilon = \frac{12}{k(K+1)} \left[ \sum_j R_j^2 - \frac{k(k+1)^2}{4} \right]$$

$\varepsilon$ has to be iteratively checked against f $f_{rd}$ to test the significance of value.

The decision is finalized when $ff_{rd} > f_\varepsilon$, where $$f_\varepsilon = \frac{(N-1)\varepsilon}{N(K-1) - \varepsilon}$$

(Object Lost Threshold)

An alert is issued when $ff_{rd} > f_\varepsilon$.

Figure 4:
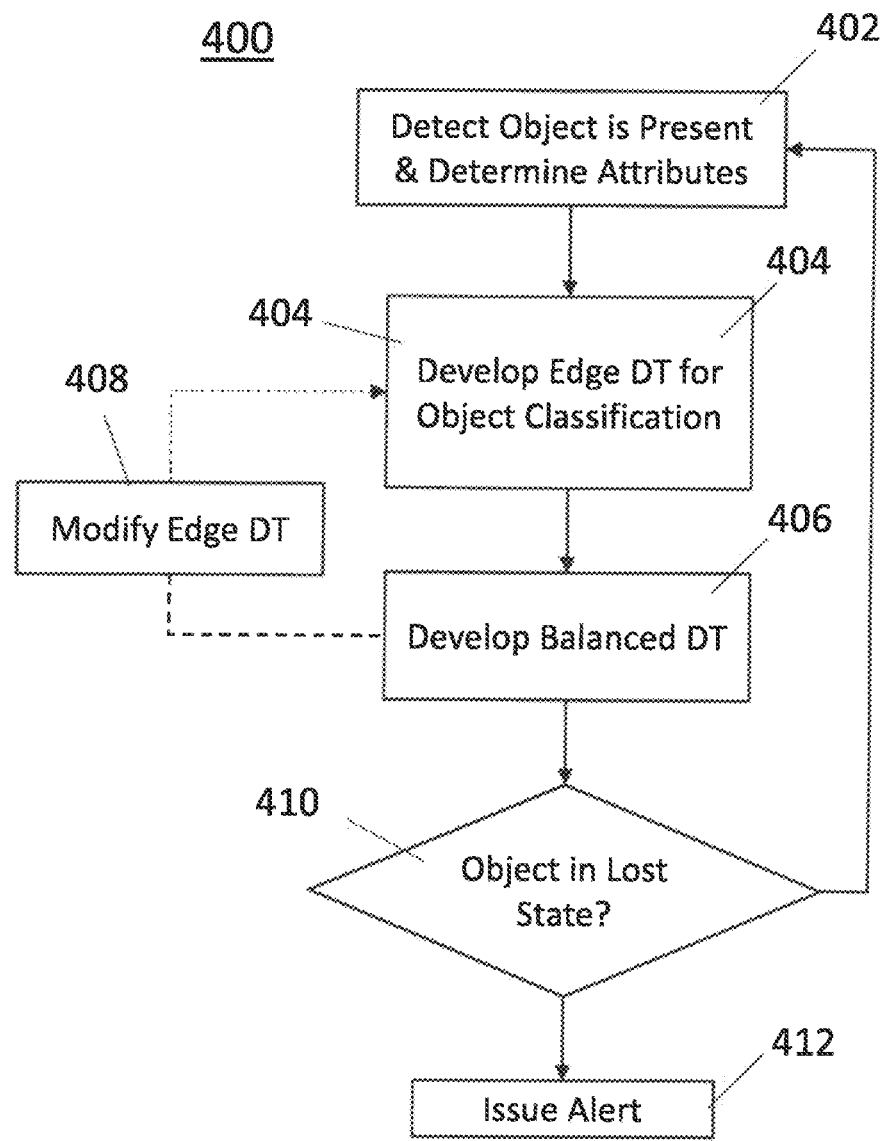
FIG. 4 shows one embodiment of an exemplary flowchart of an example method according to embodiments of the present invention.

In view of the above descriptions, FIG. 4 provides a flowchart 400 of an exemplary embodiment of a method of the present invention. In step 402, video data from cameras is analyzed for detecting presence of an object. Such image analysis is well known in the art as including convolutional and filtering processing. This image processing would typically be executed in some embodiments of the present invention in the edge system 200 shown in FIG. 2 and determines the attributes of an object that provide the basis for the edge DT being developed/maintained in step 404 to classify and track the object.

In step 406 the balanced DT is developed in the refining database 202 shown in FIG. 2. The balanced DT is developed/maintained in the refining database section 202 from data of the edge DT and refines the edge DT based on a different criterion which essentially determines which attributes are most significant in classifying the object. Therefore, in step 408, the refining dataset section provides modifications to the edge DT, reflecting which attributes are most significant in maintaining the classification of the edge DT. This feedback mechanism in step 408 between the edge DT of the edge system and the balanced DT of the refining dataset system is achieved by the two different fitness functions described above, which permits the system to detect when the DTs should be updated for attributes that become more significant as objects are detected/tracked.

In step 410, the refining dataset section determines whether the object is in the LOST state and issues an alert in step 412 if the LOST threshold is reached.

Computer System Implementations

Embodiments of the present invention can be implemented in various computer-based systems, including an exemplary system in which a single computer receives inputs from a plurality of video sensors. Other exemplary implementations could include components which are implemented as part of a cloud service. For example, the video sensor data in the scenario of FIG. 1 could be provided as input data into a cloud service that performs the processing described above.

It would also to be understood by one of ordinary skill that, although this disclosure includes a detailed description on cloud computing, as follows, implementation of the teachings recited herein are not limited to a cloud computing environment. Rather, as exemplarily shown in FIG. 1, embodiments of the present invention are capable of being implemented in conjunction with any other type of computing environment now known or later developed.

It would also to be understood by one of ordinary skill that although this disclosure includes a detailed description on cloud computing, as follows, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
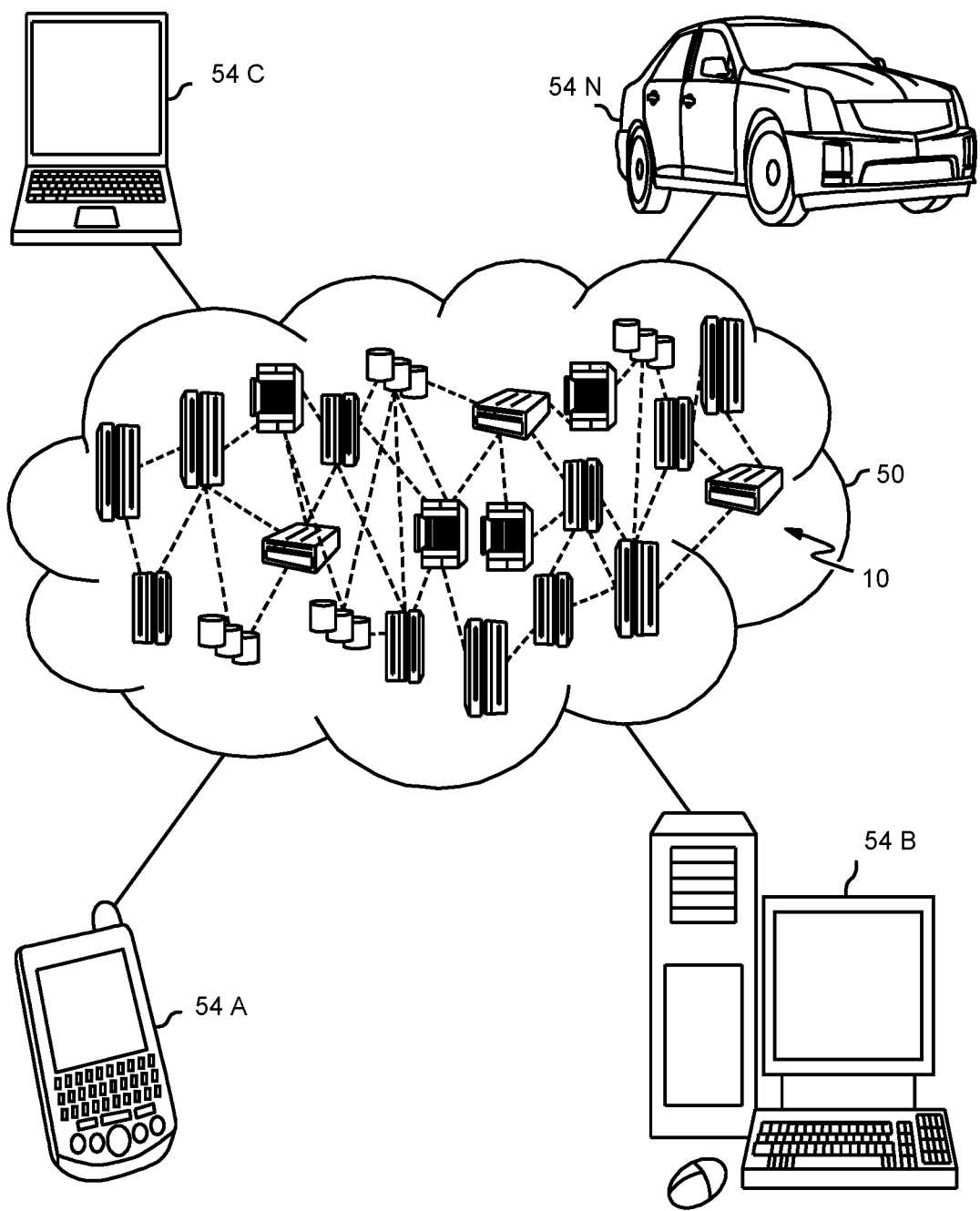
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
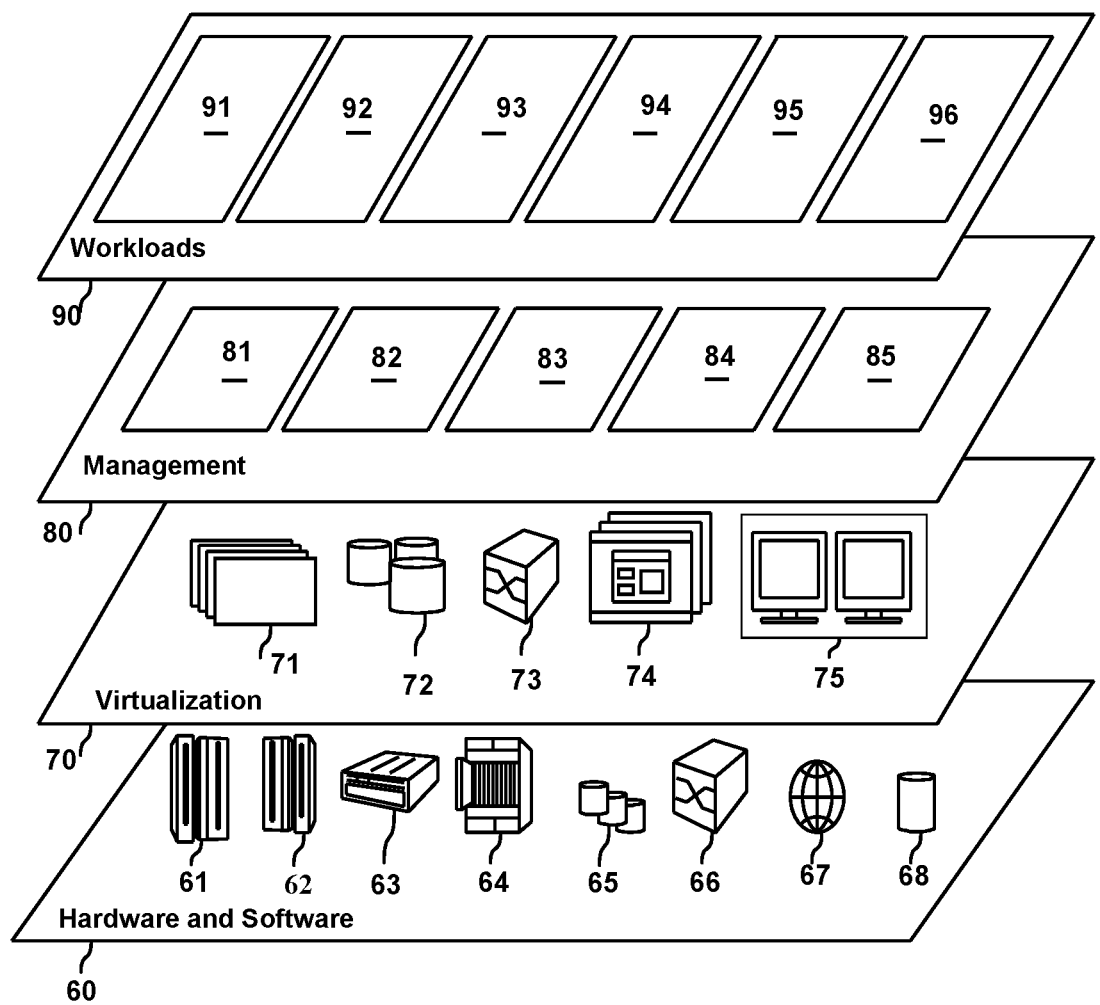
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include tasks related to the implementation of the present invention including, for example, the receipt of input video data from camera sensors, the analysis of this input video data, the establishment and maintenance of the edge DT of the edge system and the balanced DT of the refining database system, the calculations of the edge DT and the balanced DT fitness functions along with the modifications of the edge DT due to these fitness functions, the calculation of the object LOST threshold and determination of whether to issue a LOST alert.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method of recognizing and tracking an object, the method comprising:
   receiving image data from at least two camera sensors;
   analyzing the image data to determine attributes of an object detected as present in the image data;
   developing a first decision tree (DT) to classify the object, based on the attributes determined from the image data; and
   developing a second DT as a balanced DT that refines the first DT by determining which attributes are most significant in the classification of the object.

2. The method of claim 1, further comprising modifying the first DT as a result of the developing of the second DT, in order to update the classifying of the object as conditions change in the classifying of the object.

3. The method of claim 1, further comprising iteratively calculating a value for a first fitness function, for the first DT, to determine if there are one or more unreachable nodes on the first DT, due to one or more contradictory conditions.

4. The method of claim 3, further comprising iteratively calculating a value for a second fitness function, for the second DT, to determine which blocks are needed to optimize a global decision of the classification of the object.

5. The method of claim 4, further comprising iteratively calculating a value for a decision tree resultant iterative probability tracing as a threshold value to test a status of the object as being lost.

6. The method of claim 5, further comprising:
   comparing the threshold value with a current value of the second function fitness value; and
   issuing an alert if the comparison detects that the object is detected as lost.

7. The method of claim 1, as implemented as a cloud service.

8. The method of claim 1, further comprising determining a current status of the object as being lost.

9. The method of claim 1, wherein the second DT prevents the first DT from becoming congested.

10. The method of claim 1, as embodied on a non-transitory memory device as a set of machine-readable instructions.

11. An apparatus, comprising:
    a processor; and
    a memory device accessible by the processor,
    wherein the memory device stores a set of machine-readable instructions that permits the processor to execute the method of claim 1.

12. A method of recognizing and tracking an object, the method comprising:
    receiving image data from at least two camera sensors;
    analyzing the image data to determine attributes of an object detected as present in the image data; and
    concurrently developing two decision trees (DTs), wherein a first DT is developed to determine a classification of the object and a second DT is developed to prevent the first DT from becoming congested.

13. The method of claim 12, further comprising:
    determining whether the object is currently detected as being in a lost state; and
    issuing an alert if the object is detected as being in the lost state.

14. The method of claim 12, further comprising:
    iteratively calculating values for respective fitness functions for each of the two DTs; and
    exchanging information between the two DTs, as based on current values of the fitness functions.

15. The method of claim 12, as embodied on a non-transitory memory device as a set of machine-readable instructions.

16. An apparatus, comprising:
    a processor; and
    a memory device accessible by the processor,
    wherein the memory device stores a set of machine-readable instructions that permits the processor to execute the method of claim 12.

* * * * *